Oct. 30, 1934. T. G. MYERS 1,978,814
SHAFT COUPLING
Filed May 14, 1932 2 Sheets-Sheet 1

INVENTOR:
Thomas G. Myers,
BY
ATTORNEY.

Oct. 30, 1934. T. G. MYERS 1,978,814
SHAFT COUPLING
Filed May 14, 1932   2 Sheets-Sheet 2
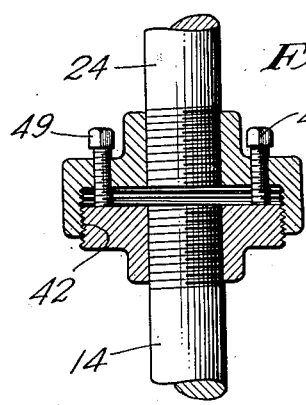
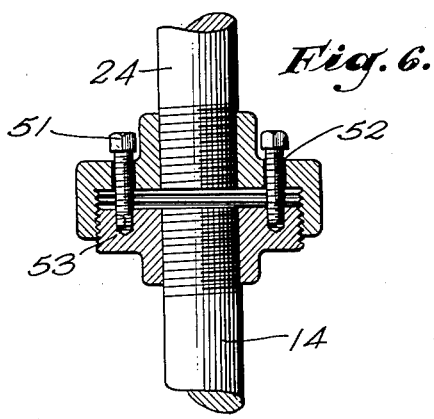
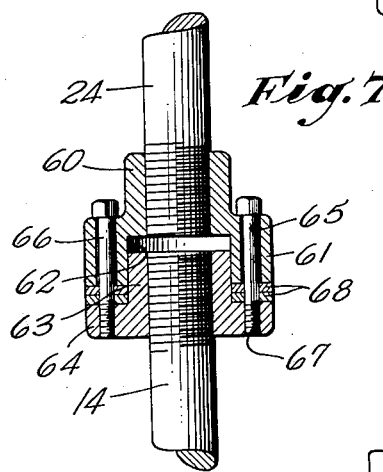
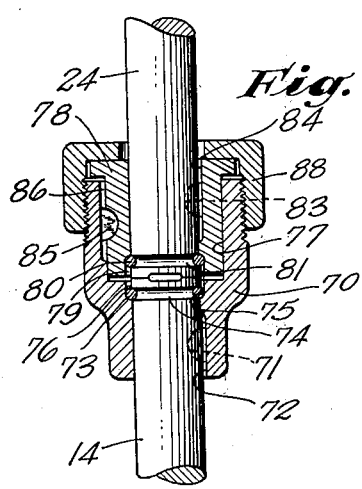
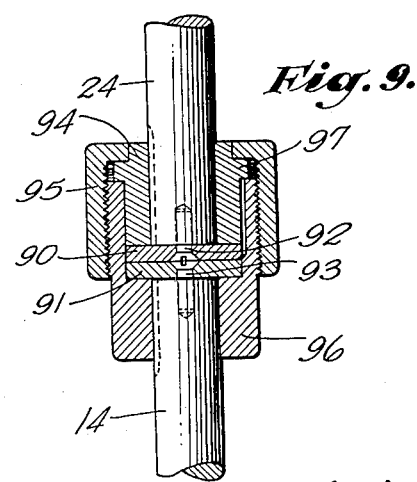
INVENTOR:
Thomas G. Myers,
By
ATTORNEY.

Patented Oct. 30, 1934

1,978,814

UNITED STATES PATENT OFFICE 1,978,814

SHAFT COUPLING

Thomas G. Myers, Los Angeles, Calif., assignor to United States Electrical Manufacturing Company, Los Angeles, Calif., a corporation of California Application May 14, 1932, Serial No. 611,348

4 Claims. (Cl. 287—62)

My invention relates to a shaft-coupling device which finds particular utility in the deep-well pumping art, though not in all instances limited thereto. It is in this capacity that I will particularly describe my invention without being limited thereto.

Deep-well centrifugal pumps usually include a pump unit positioned in a well and including one or more impellers which are secured to a line shaft, this line shaft extending upward in the well to a pump head at the upper end thereof. The vertical position of the impellers with respect to the pump unit is determined by adjusting the vertical position of the upper end of the pump shaft with respect to the drive means which is usually incorporated in such a pump head.

It is an object of this invention to provide an improved shaft-coupling device for a centrifugal pump in which the axial spacing of the line shaft and the drive shaft can be readily adjusted, thereby adjusting the position of the impellers with respect to the pump unit.

It is a further object of the invention to provide such a shaft-coupling device which is positioned below the drive means of a centrifugal pump.

Still a further object of the invention is to provide a novel shaft-coupling device which connects two shafts in adjustable axial position.

Further objects of the invention lie in the details of construction of the forms of invention herein shown.

Further objects and advantages of the invention will be made evident hereinafter.

Referring to the drawings,—

Figs. 4 to 9 are vertical sectional views of alternate forms of the invention.

Figure 1:
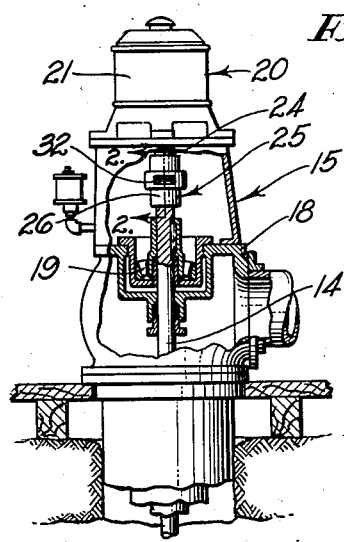
Fig. 1 is a diagrammatic view, partially in section, illustrating the shaft-coupling device in conjunction with a centrifugal pump.

Referring particularly to Fig. 1, I have shown a pump unit 10 positioned in a well 11 and including one or more impellers 12 positioned in impeller chambers 13 thereof. These impellers are secured to a line shaft 14 which extends upward to the top of the well and into a pump head 15. This pump head includes a discharge unit 18 in which a bearing 19 is mounted which journals the upper end of the line shaft 14. A drive means 20, shown in the form of an electric motor 21 but not necessarily of this type, is mounted above the discharge unit 18 and includes a drive shaft 24.

A shaft-coupling device 25 is positioned between the drive shaft 24 and the upper end of the line shaft 14 and drivably connects these shafts in such a manner that the relative axial positions thereof can be changed. This permits vertical adjustment of the impellers 12 with respect to the impeller chambers 13 so that the impellers do not frictionally engage the walls thereof.

Figure 2:
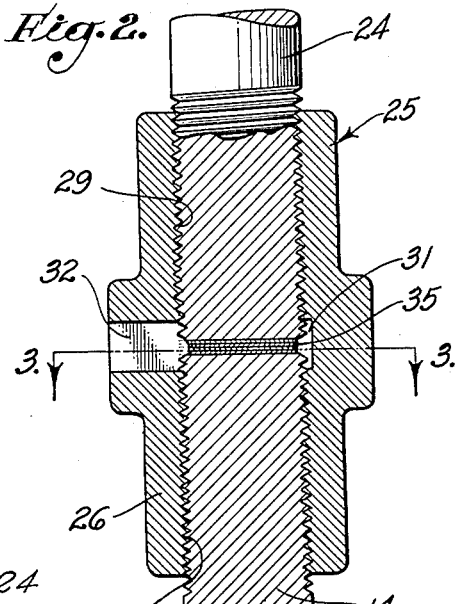
Fig. 2 is an enlarged sectional view of one form of shaft-coupling device taken along the line 2—2 of Fig. 1.
Figure 3:
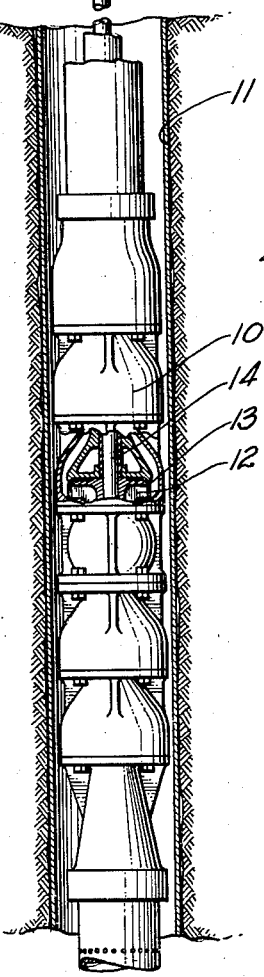
Fig. 3 is a medial sectional view taken on the line 3—3 of Fig. 2.
Figure 3:
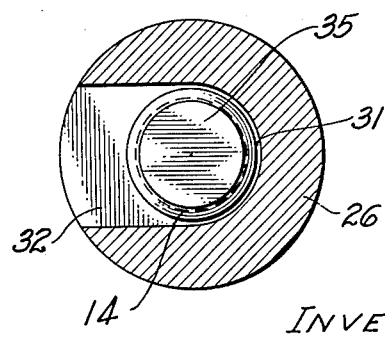

The details of one form of the shaft-coupling device 25 are best shown in Figs. 2 and 3. Referring to these figures, the coupling device therein shown includes a body 26 providing a cavity 27 which receives the upper end of the line shaft 14. It is desirable that the line shaft 14 may be moved into and from the cavity 27 thereby changing the axial position of the line shaft 14 with respect to the body 26. This may be accomplished by threading the upper end of the shaft and forming corresponding threads in the cavity 27, as shown in Fig. 2, but it should be understood that other types of connecting means which will permit axial adjustment between the line shaft 14 and the body 26 may be utilized. The upper end of the body 26 is secured to the lower end of the drive shaft 24. This may be accomplished by various means. In the preferred embodiment of the invention this action is established by providing a threaded cavity 29 in the upper end of the body 26, the lower end of the shaft 24 being correspondingly threaded so as to be retained therein. Other means for securing the shaft 24 to the body 26 also are within the scope of this invention.

The cavities 27 and 29 open on a central space 31, there being an outward extending passage 32 communicating between this central space and the exterior of the body 26. The width of this passage 32 is greater than the diameter of the shafts 14 or 24 so that one or more discs 35 may be moved therethrough and into the central space 31. When the shafts 14 and 24 are threaded into the body 26 their adjacent ends abut against these discs whereby these discs act as a spacer means for determining the relative axial positions of the shafts 14 and 26, these discs also locking the shafts relative to each other through the frictional engagement between the ends of these shafts and the discs. Any number of these discs may be utilized to effect the desired axial spacing of the shafts.

If it is desired that the ends of the shafts be spaced a distance which is greater than the vertical dimension of the passage 32, several of these discs can be moved into the central space 31, and by threading the shaft 14 outward with respect to the cavity 27, these discs may be moved downward in the cavity 27, this being made possible due to the fact that the discs are smaller in diameter than the cavity 27. This clears the central space 31 so that additional discs can be inserted therein after which the shaft 14 is threaded tightly into the cavity and into abutting relationship with the discs.

To change the axial position of the line shaft to properly position the impellers 12 it is only necessary to slightly unscrew this line shaft and change the number of discs in the central space 31 after which the shaft 14 is again threaded into the cavity 27 until it abuts with the discs. During this adjusting operation the line shaft 14 need not be removed from the cavity 27.

Ordinarily no auxiliary locking means is needed between the shafts and the body 26, though such auxiliary means may be provided if desired. Such locking means might be in the form of set-screws, clamping means, etc., well known in the art.

It is, of course, possible to permanently secure one of the shafts to the body 26 and allow the other shaft to be partially removed to permit insertion of the desired number of discs. On the other hand, in the form shown in Fig. 2 each of the shafts 14 and 24 may be partially withdrawn thereby facilitating the adjustment of the axial positions of the shafts.

The outward extending passage 32 is an important part of this form of the invention, for it permits the discs to be easily inserted in place while the shafts are connected to the body 26. So also this passage permits visual inspection of the number of discs utilized.

Figure 4:
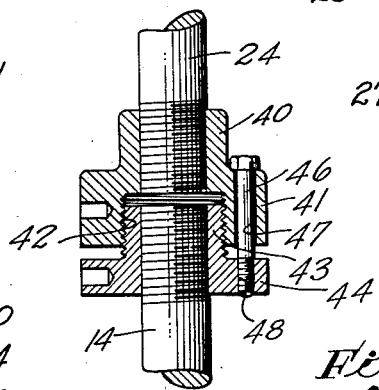

Another form of the invention is shown in Fig. 4 in which a female member 40 is threaded or otherwise secured to the lower end of the shaft 24 and provides a flange 41. A space 42 is formed in the lower end of this member, and, in the form shown in Fig. 4, is threaded to receive a boss 43 of a male member 44 which is suitably secured to the shaft 14, as by being threaded thereto. By turning the member 44 with respect to the member 41 the axial positions of the shafts 14 and 24 are thus changed. Any suitable lock means may be provided for locking these members with respect to each other when the shafts are in the desired position. In Fig. 4 I have shown this lock means as comprising studs 46 extending through openings 47 of the flange 41 and being threaded into openings 48 of the member 44.

A somewhat similar structure is shown in Fig. 5 except that the space 42 is of larger diameter, thus permitting studs 49 to be utilized as a lock means. These studs are threaded through the flange of the female member and extend into the space 42 to pressurally contact the male member, thus locking the male and female members when the shafts are in the desired axial position.

The form of the invention shown in Fig. 6 differs from that shown in Fig. 5 only in so far as the locking means is concerned. This locking means is shown in Fig. 6 as comprising one or more studs 51 which extend through openings 52 of the female member, these openings being larger than the studs. The lower ends of these studs are threaded into threaded holes 53 of the male member. When the shafts are in the desired position, these studs are moved downward through the openings 52 and threaded into that one of the openings 53 of the male member which is immediately therebelow.

In the form of the invention shown in Fig. 7 the female member is indicated by the numeral 60 and includes a flange 61. The lower end of this member provides a cylindrical space or cavity 62 into which a boss 63 of a male member 64 slidably extends. Openings 65 are formed through the flange 61 and loosely receive studs 66 which are threaded into threaded openings 67 of the male member 64. By turning the studs 66 the member 64 can be moved toward or away from the member 60, thus changing the axial position of the shafts. Shims or discs 68 are positioned between the flange 61 and the male member 64 and cooperate with the studs to form a locking means for the members 60 and 64.

In the form of the invention shown in Fig. 8 the female member is indicated by the numeral 70 and is secured to the upper end of the shaft 14. In the form shown, this attachment is secured by the use of a key 71 carried by the shaft 14 and extending into a keyway 72 of the female member 70. In this form of the invention the shaft 14 is not threaded but can slide axially with respect to the member 70. Withdrawal of the shaft 14 from this member is prevented by an annular split ring 73 positioned in a groove 74 of the shaft 14, this ring resting against a shoulder 75 of the member 70 to support the weight of the shaft 14 and its annexed parts. This shoulder is formed at the bottom of a cavity 76 this cavity being of such diameter as to snugly retain the split ring 73 and prevent spreading thereof regardless of the pull on the shaft 14.

The upper end of the female member 70 provides a cavity or space 77 in which a male member 78 is slidable. The lower end of this male member provides a cavity 79 similar to the cavity 76 and an annular split ring 80 is positioned therein so as to engage the end wall of the cavity 79. This split ring is retained in a channel 81 of the shaft 24, and is prevented from movement from the channel 81 due to the fact that the diameter of the cavity 79 is substantially the same as the outer diameter of the ring, thus preventing a spreading thereof.

The shaft 24 carries a key 83 which extends into a keyway 84 of the member 78 so as to permit longitudinal movement but preclude rotative movement of this member with respect to the shaft. So also the male member 78 carries a key 85 which extends into a keyway 86 of the female member 70 to preclude rotation therebetween.

The position of the male member 78 with respect to the female member 70 is controlled by a cap 88 threaded to the female member and engaging the upper end of the male member 78. As this cap is turned the relative axial positions of the shafts 14 and 24 are thus changed. These shafts may be retained in the desired axial position either by bringing the ends of the shafts into abutting relationship as shown in Fig. 8 or by utilizing shims or discs therebetween as previously described.

The form of the invention shown in Fig. 9 is similar to that shown in Fig. 8 with the exception that the annular rings are replaced by plates 90 and 91 respectively connected to the ends of the shafts 24 and 14 by any suitable means such as screws 92 and 93. The male member in this view is indicated by the numeral 94 and is moved into contact with the upper surface of the plate 90 through the action of a cap 95 threaded to the female member 96, this cap engaging an annular shoulder 97 of the male member 94 in effecting this end. The relative axial positions of the shafts 24 and 14 may be changed by changing the thickness of the plates 90 and 91 utilized, the cap 95 cooperating with these plates in defining a locking means. The members 94 and 96 are respectively keyed to the shafts 24 and 14 as shown.

In all of these forms of the invention it will be clear that it is possible to adjust the relative axial positions of the shafts without mechanically disconnecting these shafts. Thus, this adjustment may be made without dropping the impellers to the bottom of the impeller chambers. This is a very important feature of the invention.

I claim as my invention:

1. In a shaft-coupling device adapted to connect a drive shaft and a driven shaft and to determine the relative axial positions thereof, the combination of: a body secured to one of said shafts and including a cavity into which the end of the other of said shafts extends, said body providing a passage opening on said cavity and extending outward to open on the exterior of said body; and spacer means insertable into said cavity through said passage and against which said end of said one of said shafts abuts when moved into said cavity, the thickness of said spacer means thus determining the axial spacing of said shafts.

2. In a shaft-coupling device adapted to connect two shafts end to end in adjustable axial position relative to each other, the combination of: a body providing threaded cavities into which the ends of said shafts may be threaded, said cavities opening on a central space of said body, said body providing an outward extending passage communicating with said central space and with the exterior of said body; and spacer means insertable into said central space through said passage and against which said shafts abut when threaded into their respective cavities for determining the axial spacing of said shafts.

3. In a shaft-coupling device adapted to transmit torsional and axial force between a driving shaft and a driven shaft, and permitting relative axial adjustment of said shafts, the combination of: a body secured to one of said shafts and including a cavity into which the end of the other of said shaft extends, said body providing a passage communicating with said cavity and with the exterior of said body; spacer means insertable into said cavity through said passage and against which said end of one of said shafts abuts when moved into said cavity, the thickness of said spacer means determining the axial spacing of said shafts; and adjusting means cooperating with said body and said end of one of said shafts and serving to transmit the axial load of said coupling during the adjusting period.

4. In a shaft-coupling device adapted to transmit torsional and axial force between a driving shaft and a driven shaft, and permitting relative axial adjustment of said shafts, the combination of: a body secured to one of said shafts and including a cavity into which the end of the other of said shafts extends; adjusting means constraining said end of said shaft to move in an axial direction in response to a relative angular motion between said body and said end of said shaft, said adjusting means serving to transmit the axial load of said coupling during the adjusting period; walls forming a passage in said body and extending outward to open on the exterior of said body; and spacer means insertable into said cavity through said passage and against which said end of said shaft abuts when moved into said cavity, the thickness of said spacer means determining the axial spacing of said shafts and serving to maintain the adjusted axial position of said shafts.

THOMAS G. MYERS.